United States Patent Office 3,077,381
Patented Feb. 12, 1963

3,077,381
PHOSPHORIC ACID
Ingolfur Bergsteinsson, Orange, Irving D. Webb, Yorba Linda, and Peter Stanley Backlund, Anaheim, Calif., assignors to Union Oil Company of California, Los Angeles, Calif., a corporation of California
No Drawing. Filed Nov. 2, 1959, Ser. No. 850,017
7 Claims. (Cl. 23—165)

This invention relates to the shipping, storing, handling and use of concentrated phosphoric acid, and in particular relates to a novel concentrated phosphoric acid composition having low corrosivity, and a low solidification temperature, useful in many varied applications, such as gas drying, metal pickling, fertilizer manufacture, etc.

Of the known forms of phosphoric acid such as hypophosphoric, $H_4P_2O_6$, metaphosphoric, $HPO_3$, pyrophosphoric, $H_4P_2O_7$, and orthophosphoric, $H_3PO_4$, the latter is the form predominantly used and manufactured; however, pure orthophosphoric acid corresponds to only about 72.5 weight percent $P_2O_5$, and acids having a higher $P_2O_5$ content will of necessity contain varied amounts of meta- and pyro-phosphoric acid. For these reasons, the term "phosphoric acid" as used herein refers to all the aforementioned forms of phosphoric acid, and the acid concentration will be specified as a $P_2O_5$ weight percentage.

The shipping, storing and handling of phosphoric acid is troublesome because of its corrosivity and solidification characteristics. It has long been known that concentrated phosphoric acid having a $P_2O_5$ content between about 67 and 74 weight percent is non-corrosive to ordinary carbon steel. However, such acid is a solid at ambient temperatures. For this reason, many manufacturers and users of phosphoric acid prefer to handle acid in dilute form even though this necessitates the shipping and storing of large quantities of water and the use of expensive corrosion-resistant containers. One recommended type of storage tank for the dilute acid, for example, comprises a concrete shell lined with several layers of asphalt and tar paper, then lead, and finally acid-proof masonry.

It is a purpose of this invention to obviate the need for the special corrosion precautions heretofore required and permit handling of the acid in the liquid state at most ambient temperatures by providing novel concentrated phosphoric acid compositions having low freezing points and being substantially non-corrosive.

The compositions which achieve this purpose are those prepared by adding a minor amount of ammonia or an ammonium salt to phosphoric acid containing between about 67 and about 74 weight percent of $P_2O_5$ on an impurity-free basis. Since the acid itself is a complex mixture containing varying amounts of the aforementioned individual phosphoric acids depending upon its concentration, and since the extent and manner in which the added ammonia or ammonium salt reacts with such acids, and the type of compounds which are thereby formed, are not known or ascertainable by known means, the novel compositions of the invention are herein defined and claimed by means of their method of preparation rather than in positive terms which at best can only be speculative. Regardless of the specific chemical nature of these compositions and the identity of the components thereof, the use of ammonia or ammonium salts in this manner depresses the freezing point of the acid to an unexpected degree, from its high freezing point in excess of 70° F. to less than 40° F., thereby insuring that the composition will be a liquid at most ambient tempertures. The amount of ammonia or ammonium salt required to achieve this effect is so small that the acid is in no way rendered unsuitable for any of its major uses; in fact, when the acid is to be employed in the manufacture of fertilizer, the addition of ammonia or ammonium salts thereto is actually beneficial since the added nitrogen is available as a plant nutrient.

As stated, the present compositions are obtained by the addition of ammonia or an ammonium salt to concentrated phosphoric acid of between about 67 and about 74 weight percent $P_2O_5$ content. The acid may be of the so-called "wet-process" 'type, which is prepared by leaching phosphate rock with sulfuric acid and thereafter separating the precipitated calcium sulfate, or it may be the so-called "white acid" which is prepared by the thermal reduction of phosphate rock. By reason of its low cost and ease of handling, the freezing point depressant is preferably ammonia, but ammonium salts are substantially equivalent thereto and may be employed if desired. Suitable ammonium salts include mono- and di-ammonium phosphate, ammonium sulfate, ammonium nitrate, ammonium carbonate, ammonium chloride, ammonium acetate, ammonium bromide, ammonium silicate, ammonium lactate, ammonium citrate, ammonium gluconate, or combinations thereof. Of such ammonium salts, those of a strong inorganic acid, e.g., sulfuric acid, hydrochloric acid, nitric acid, phosphoric acid, and the like, are preferred.

The ammonia or ammonium salt additive is employed in an amount sufficient to effect a substantial decrease in the freezing point of the acid. Such amount will depend upon the identity of the additive itself as well as upon the source of the phosphoric acid, the nature and amount of impurities it contains, and its initial concentration, but it generally such that the final composition contains between about 0.4 and about 2.5 percent of nitrogen based on the weight of the entire composition. Th preferred additive, ammonia, is usually employed in an amount between about 0.5 and about 3 percent by weight.

Procedure-wise, the present compositions are prepared simply by intimately admixing the additive with the concentrated acid. The latter is relatively viscous at ambient temperatures, and in the interest of ease of mixing, it is preferred to effect the addition of the additive at a somewhat elevated temperature, e.g., 50°–150° C. Conveniently, the additive may be admixed with the acid as it leaves the evaporator employed for bringing it to its final high concentration.

The following examples will serve to illustrate the compositions provided by the invention, and to demonstrate the effect of the present additives in depressing the freezing point of concentrated phosphoric acid, but are not to be construed as limiting the invention

EXAMPLE 1

Four samples of a concentrated wet-process phosphoric acid having a $P_2O_5$ content of about 69 weight percent and containing about 5 weight percent impurities were treated by the addition thereto of 0.55, 1.0, 1.8 and 2.7 weight percent of ammonia, respectively. The ammonia addition substantially depressed the freezing point of each sample in proportion to its concentration without affecting the non-corrosive nature of the acid. The results are summarized in the following table:

*Table 1*

| Composition | Additive, Weight Percent | Freezing Point, °F. | Corrosivity |
|---|---|---|---|
| Acid | None | >70 | Nil |
| Acid+NH₃ | 0.55 | <60 | Nil |
| Acid+NH₃ | 1.0 | 55 | Nil |
| Acid+NH₃ | 1.8 | <40 | Nil |
| Acid+NH₃ | 2.7 | <32 | Nil |

*Example 2*

Approximately 1 part by weight of di-ammonium phosphate was added with stirring to 9 parts by weight of acid having a $P_2O_5$ content of about 72.6 percent and a freezing point above 70° F. During addition of the salt, the body of acid was maintained at a temperature of about 100° C. The resulting composition had a freezing point below about 30° F., and was no more corrosive to mild steel than the original acid.

We claim:

1. A low freezing point concentrated phosphoric acid which has:
   a freezing point less than about 40° F.;
   a phosphorus content expressed as $P_2O_5$ on an impurity-free basis between about 67 and about 74 weight percent;
   a nitrogen content between about 0.4 and about 2.5 weight percent;
said low freezing point concentrated phosphoric acid being obtained from a concentrated phosphoric acid having a freezing point in excess of 40° F. by the addition thereto of a material selected from the class consisting of ammonia, monoammonium phosphate, diammonium phosphate, ammonium sulfate, ammonium nitrate, ammonium carbonate, ammonium chloride, ammonium acetate, ammonium bromide, ammonium silicate, ammonium lactate, ammonium citrate, ammonium gluconate, and mixtures thereof; and by recovery as a product said low freezing point concentrated phosphoric acid having said phosphorus content and said nitrogen content.

2. The low freezing point concentrated phosphoric acid of claim 1 which is derived from a concentrated wet-process phosphoric acid having an impurity-free $P_2O_5$ content between about 67 and 74 weight percent.

3. A composition as defined by claim 1 wherein said material is ammonia.

4. A composition as defined by claim 1 wherein said material is a mixture of monoammonium and diammonium phosphates.

5. A composition as defined by claim 3 wherein said ammonia is employed in an amount representing between about 0.5 and about 3 percent of the combined weight of phosphoric acid and ammonia.

6. A composition as defined by claim 1 wherein said material is di-ammonium phosphate.

7. A phosphoric acid as defined by claim 1 wherein the ammonia is employed in an amount representing between about 0.5 and about 3 percent of the combined weights of ammonia and phosphoric acid.

References Cited in the file of this patent

UNITED STATES PATENTS

| 2,869,996 | Vierling | Jan. 20, 1959 |
| 2,917,380 | Franklin | Dec. 15, 1959 |
| 2,950,961 | Striplin et al. | Aug. 30, 1960 |